July 11, 1939.  E. L. ELWELL  2,165,789
STICK HOLDER FOR MANUFACTURING FROZEN CONFECTIONS ON STICKS
Filed Feb. 2, 1938  2 Sheets-Sheet 1
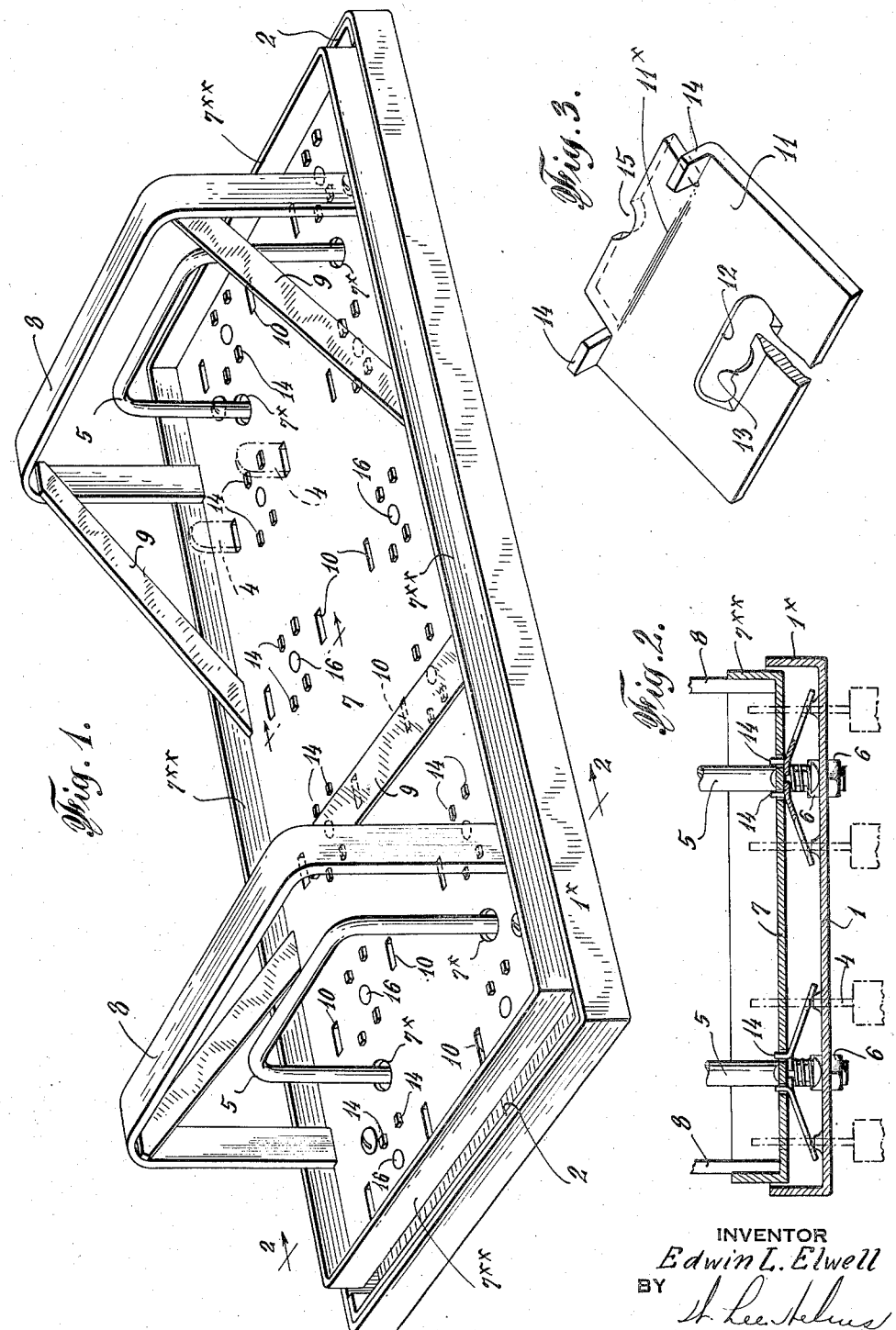
INVENTOR
Edwin L. Elwell
BY
ATTORNEY

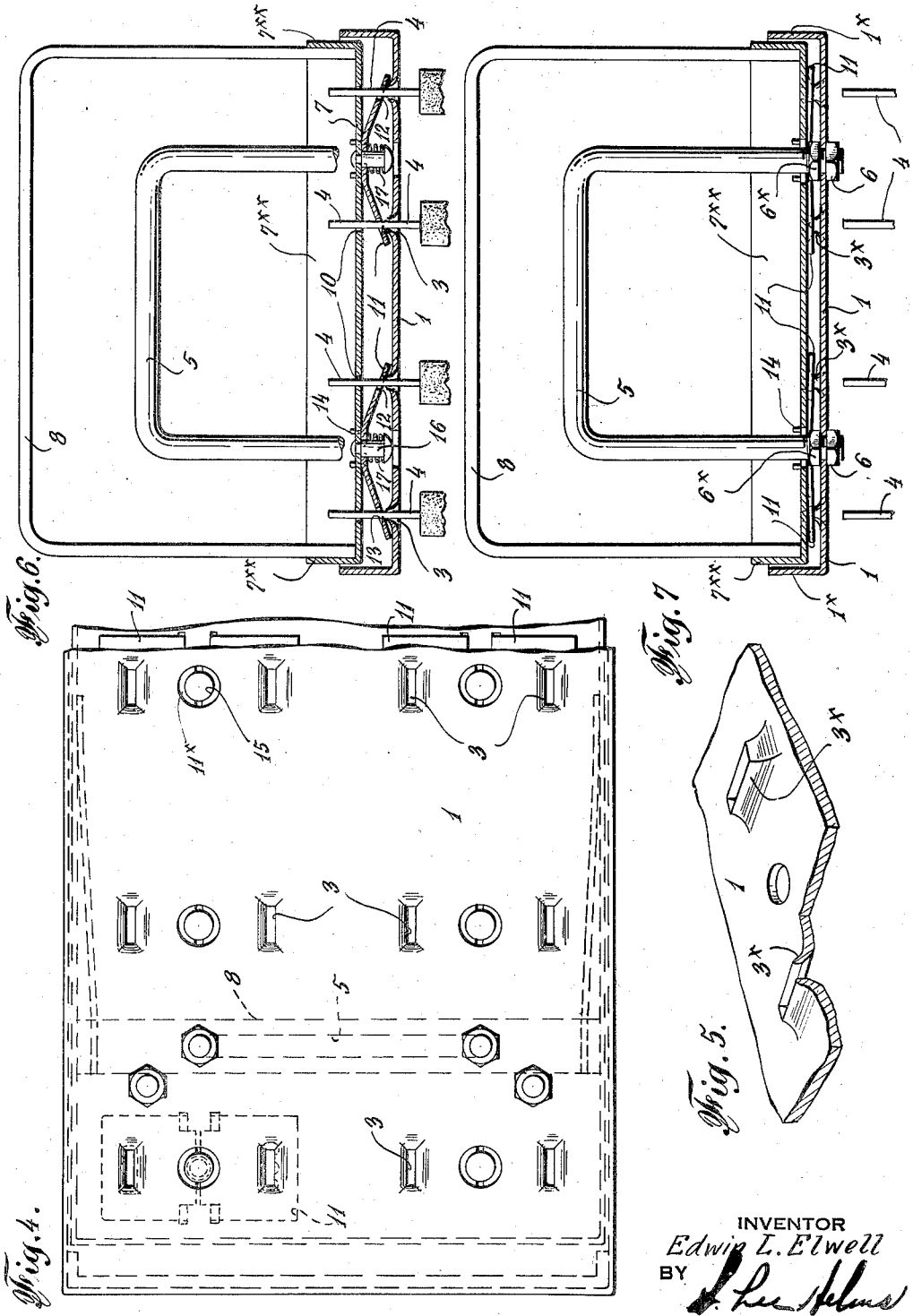

Patented July 11, 1939

2,165,789

UNITED STATES PATENT OFFICE 2,165,789

STICK HOLDER FOR MANUFACTURING FROZEN CONFECTIONS ON STICKS

Edwin L. Elwell, Baltimore, Md., assignor to Eskimo Pie Corporation, Bloomfield, N. J., a corporation of Delaware Application February 2, 1938, Serial No. 188,385

1 Claim. (Cl. 294—87)

The present invention relates to devices adapted to hold and subsequently release sticks which will ultimately be carried by frozen confection units through the association of ice cream, water ice, etc., and the stick in any suitable manner, the stick being employed as a handle member for manipulation of the frozen confection unit.

The specific object of the invention is to provide a device of the character set forth which shall be simple and durable in construction and which will provide a lower wall substantially without projecting elements and entirely without operating elements, which facilitates normal use of the device for long periods without derangement of parts, which provides upper and lower plates which enclose and protect the operating elements of the device, and which employs a novel principle in the form and arrangement of gripping members for the stick and the means for releasing the same.

Further objects of the invention will be hereinafter set forth.

The invention will be described with reference to the accompanying drawings, in which:

Figure 1 is a perspective view of a stick holder constructed in accordance with the invention.

Figure 2 is a transverse section on the line 2—2, Figure 1.

Figure 3 is a perspective view, partly broken away, showing one of the stick gripping members.

Figure 4 is an enlarged fragmentary plan view of the device from the lower face thereof.

Figure 5 is an enlarged fragmentary view, showing the upper face of the lower plate.

Figure 6 is a transverse sectional view showing the position of the elements in stick-gripping position.

Figure 7 is a view similar to Figure 6, showing the position of the parts in releasing the sticks.

In the drawings, 1 indicates a base plate which is preferably formed with an upwardly extending and surrounding flange 1x which may be reinforced by the end reinforcing strips 2 (Figure 1). Plate 1 is formed with rows of stick-receiving apertures at 3 for the reception of sticks 4. Each stick aperture is countersunk so as to provide upwardly projecting stick-guiding walls as shown at 3x, Figure 5, and the walls of the opening from the lower face at plate 1 are tapered so that when a stick is positioned slightly out of register with a stick opening, it will, nevertheless, be guided to the opening when a relative movement is given to the stick and the plate toward each other.

Plate 1 carries handle members 5 and each member may be a rod bent in U-formation and threaded at its lower end so that the threaded ends may pass through apertures in the plate and receive nuts 6 opposite shoulders or heads 6x carried by the handle-legs at the upper side of said plate 1. As a substitute for the nut 6, the lower ends of the handle-legs may be headed over upon the lower face of plate 1. These handle members pass through apertures at 7x in a gripper carrying plate 7 which also may have upwardly extending boundary flanges 7xx.

The gripper carrying plate 7 is provided with handles 8 which may be made of flat bar-stock bent in U-formation, each leg of the handle abutting the inner surface of the flange 7xx and being spot welded or otherwise secured thereto. Reinforcing bracket arms 9 may be employed to further connect the handles 8 with flanges 7xx, as shown in Figure 1.

In the present form of the device, gripper carrying plate 7 is formed with six rows of stick-receiving apertures, there being four apertures in each row, the apertures being indicated at 10.

Means also are provided for movably supporting a plurality of grippers, one for each stick, a perspective view of one of the grippers being shown in Figure 3. Each gripper is formed with a plate-like section 11 having a stick-receiving aperture at 12, the apertured wall at one side thereof being preferably formed with a bevelled tooth formation, as shown at 13. At one end plate 11 is formed with two upwardly extending ears 14 and the end of the section of the plate intermediate the ears is angularly bent as indicated at 11x, Figure 3, said angularly bent section being formed with arcuate recess 15 for a purpose now to be described.

Formed in gripper carrying plate 7 intermediate two stick-receiving apertures of each row of apertures are formed two sets of the ear-receiving apertures, each set comprising two apertures. Each set of apertures receives the ears 14 of a gripper plate so that the gripper plates extend in opposite directions, as shown more particularly in Figures 2, 6 and 7. The apertures receiving ears 14 will be sufficient in size to permit a lateral movement of the ears to accommodate the movement of each gripper plate from the position shown in each of Figures 2 and 6 to the position shown in Figure 7 and vice versa. When each set of gripper plates is positioned below plate 7 and the ears projected upwardly through the appropriate apertures, each gripper plate will be held against free lateral and upward movement, and downward movement of the gripper plate is restrained by the following instrumentalities:

Passing upward through plate 7 and headed at the top thereof, is a stud 16 best shown in Figure 6, the stud being provided with a shoulder which abuts the lower wall of plate 7. Surrounding the stud, in each case, is a spiral spring 17 which rests upon the lower headed end of the stud. The arcuate recess 15 of each of the set of two gripper plates lies close to the adjacent stud 16 and the spring acts upon the said set of gripper plates to hold them normally in the position shown in Figures 2 and 6. They may, however, have an upward swinging movement to the position of Figure 7 in opposition to the tension of the spring.

When the device is inverted as in the position of Figure 4, the sticks may freely be passed through the stick apertures 3, 12 and 10, those at 12 being in the grippers. Due to the gravitational action of plate 1 it will, in said inverted position, move slightly toward plate 7 and hence the grippers will be moved slightly toward plate 7 and thus the sticks may be inserted through the gripper apertures with ease. There will, nevertheless, be sufficient frictional action thereon to permit the reversal of the device so that it will assume the position shown in Figure 6. In this case the reverse gravitational action will occur with respect to plate 1 permitting movement of the grippers, under the action of spring 17, to the position shown in Figures 2 and 6, which will cause the toothed edge of each gripper aperture to firmly engage the stick extending through the aperture and the greater the pull upon the stick, the more firm this gripping action will be. Thus the weight of frozen confections on the sticks will increase the gripping bond between the grippers and the sticks by which said frozen confections are held. Through handles 8 the device may then be manipulated as in dipping frozen confections into a chocolate or other liquid coating material, etc., etc.

It is unnecessary, in the operation of the device, that sticks be inserted through the apertures of the plates and grippers with the device inverted, since the device may be placed in association with sticks held in frozen confection material, or units of frozen confections and the device moved relatively to the thus held sticks so that the sticks are caused to enter the apertures. The device may then be used by manipulation of handles 8 to remove the stick held confections from any initial position, as, for example, from molds after a defrosting operation, freeing the frozen confections from the mold.

When it is desired to release the sticks, as with frozen confections thereon, each handle 8 may be engaged by the palm of the operator's hand and the fingers may be employed to move the handles 5 upwardly. This action will bring the grippers to the position of Figure 7, relieving their pressure upon the sticks and the sticks will gravitationally be freed from the device, particularly when they carry frozen confection units.

Having described my invention, what I claim and desire to secure by Letters Patent, is as follows:

A stick holder for manufacturing frozen confections on sticks, comprising a plate formed with a plurality of rows of apertures, each adapted to receive a stick, each row of apertures comprising a plurality of sets of two apertures each, a set of gripper members for each set of apertures, each gripper member comprising a plate formed with a stick-receiving aperture, an angularly extending fulcrum section adapted to abut the plate, a spring engaging said fulcrum section of the gripper member for holding the latter angularly with respect to the plate, and means moving the gripper members simultaneously to change their said angular positions.

EDWIN L. ELWELL.